United States Patent [19]
Hong

[11] Patent Number: 4,517,694
[45] Date of Patent: May 21, 1985

[54] POLLEN GATHERING DEVICE

[76] Inventor: Soon Y. Hong, 23-528-Ho, 147 Hoe Hyun-Dong 1-Ga, Chung-Ku, Seoul, Rep. of Korea

[21] Appl. No.: 547,499

[22] Filed: Nov. 1, 1983

[30] Foreign Application Priority Data

Nov. 1, 1982 [KR] Rep. of Korea .................... 82-8615

[51] Int. Cl.³ .............................................. A01K 47/06
[52] U.S. Cl. ........................................................ 6/4 R
[58] Field of Search .......................................... 6/1, 4 R

[56] References Cited

U.S. PATENT DOCUMENTS 3,371,360 3/1968 Antles et al. ............................ 6/4 R
3,995,338 12/1976 Kauffeld ................................. 6/4 R
4,367,563 1/1983 Ferguson et al. ...................... 6/4 R
4,435,867 3/1984 Jeong ..................................... 6/4 R

FOREIGN PATENT DOCUMENTS 609257 9/1960 Italy ....................................... 6/4 R Primary Examiner—Robert P. Swiatek
Attorney, Agent, or Firm—Birch, Stewart, Kolasch & Birch

[57] ABSTRACT

A pollen gathering device adapted to be connected with a beehive comprising separate and unique inlet and outlet which provide an effective traffic pattern within the device so that the pollen can be collected with minimal injury to the bees.

3 Claims, 4 Drawing Figures

POLLEN GATHERING DEVICE

BACKGROUND AND SUMMARY OF THE INVENTION

The present invention is directed to a pollen gathering device connected with a beehive.

More particularly, the present invention is directed to a pollen gathering device wherein the entrance and exit holes for the honeybees are provided in separate locations of the device to prevent the honeybees from hurting themselves by mass contact. The back portion of the entrance holes is provided with a plurality of projecting elements so as to assist the honeybees to hold themselves by their forelegs when they enter into the beehive in order to gather the pollen.

The pollen gathering devices of the prior art do not provide entrance and exit holes apart from each other. Also, the number of holes are few in number so that the honeybees tend to hurt themselves by their mutual contact when coming and going from the device. Such limited access also retards the attraction of the honeybees because of the crowdiness in the entranceway which results in reduced pollen gathering.

Accordingly, an object of the present invention is to provide a pollen gathering device adapted to be connected with a beehive which substantially eliminates the problems encountered in the prior art devices such as is exemplified by a one entranceway device.

Another object of the present invention is to provide a separate entrance and exit and to provide the entrance with a plurality of holes having associated therewith projecting elements to improve pollen gathering.

A further object of the present invention is to provide a specific exit device forming a grid or netlike wire cage, which makes it easier for honeybees to leave the device through a bright outlet.

Still another object of the present invention is to provide a pollen gathering assembly which is very convenient to assemble and disassemble and to transport from one location to another.

Other objects and further scope of applicability of the present invention will become apparent from the detailed description given hereafter. However, it should be understood that the detailed description, while indicating preferred embodiments of the invention, are given by way of illustration only, since various changes and modifications within the spirit and scope of the invention will become apparent to those skilled in the art from this description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
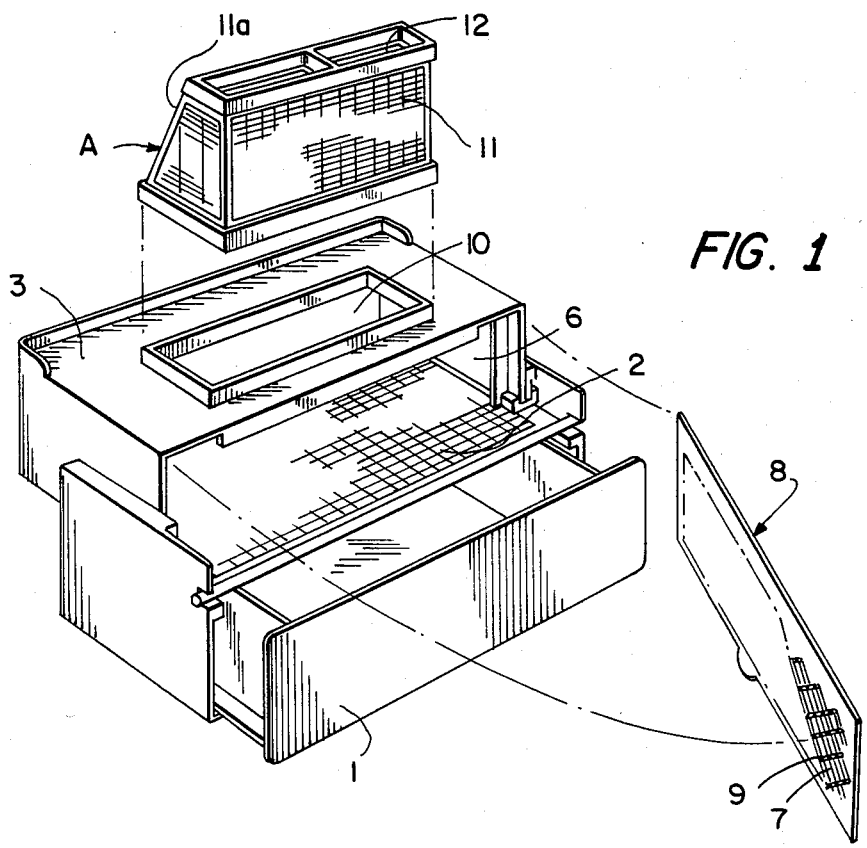
FIG. 1 shows an exploded view of pollen gathering device of the present invention.
Figure 2:
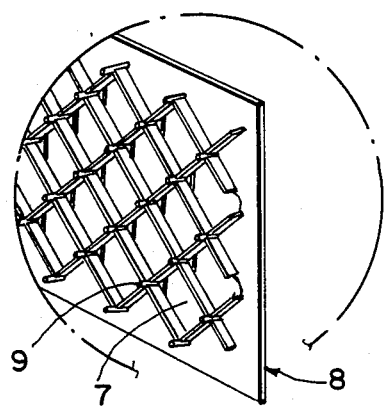
FIG. 2 shows an enlarged detail view of the pollen gathering panel of FIG. 1.
Figure 3:
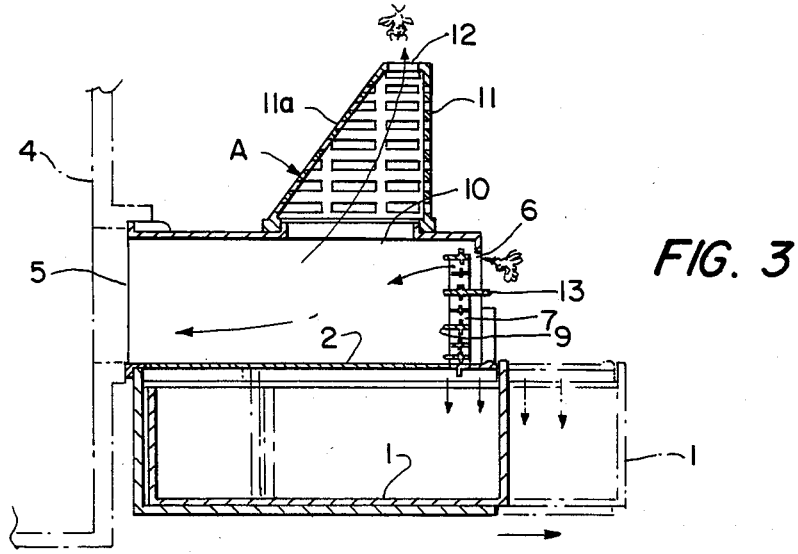
FIG. 3 shows a sectional view of the present invention.
Figure 4:
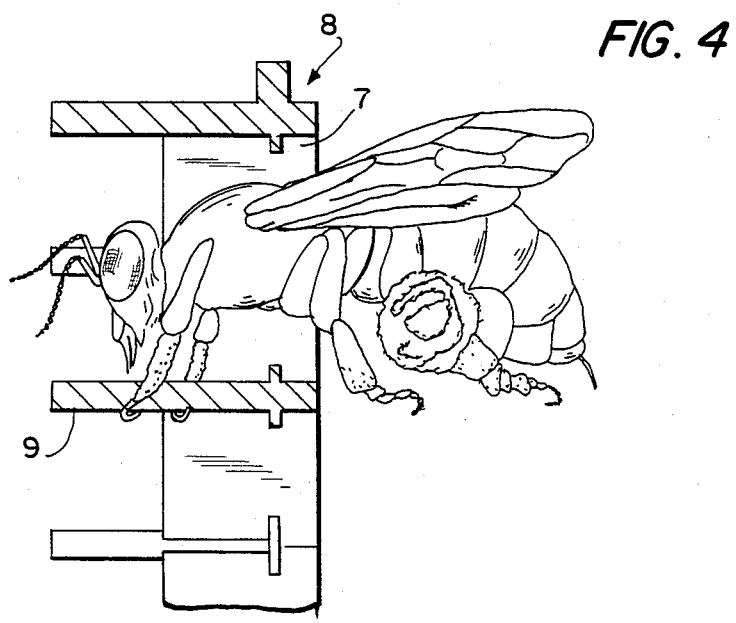
FIG. 4 shows a cross section of embodiments of the projecting parts of FIG. 3 illustrating a honeybee as it enters through the pollen gathering panel.

The present invention will now be described, in detail, in connection with the drawings wherein like reference numerals are used throughout the various views to indicate like parts.

The pollen gathering device of the present invention as shown in the drawings comprises the stand-box chamber 3 set above the pollen gathering draw-like box 1. The stand-box chamber 3 is provided with a pollen gathering grid 2 which is formed so as to be positioned below the entrance 5 of the beehive 4. The front aperture 6 of the stand-box 3 is provided with a pollen gathering panel 8, which contains a number of entrance holes 7 formed therein. Projecting elements 9 extend from the back of the pollen gathering panel 8 to be used by the honeybee's forelegs in order to facilitate entrance through the panel 8. An aperture 10 is formed at the top of the stand-box and is adapted to connect with exit means (A) comprising four side walls 11, 11a of a grid-like or net configuration and outlet or exit 12 which contains a plurality of holes for the honeybees to leave the device.

In the drawings, the reference number 13 is a handle.

The advantages of the pollen gathering device of the present invention reside in that during the coming and going of the honeybees, they do not hurt themselves by their mutual contact because of the separate entrance and exit means which are provided. Also, the front aperture 6 of the stand-box 3 is provided with a pollen gathering panel 8 which contains a number of entrance holes 7 having associated therewith a number of projecting elements 9. The exit means (A) at the top of the stand-box 3 is composed of four sidewalls 11, 11a of a grid or net configuration and the outlet 12.

The honeybees do not try to leave through the pollen gathering panel 8 which from the inside is dark but rather they select the exit means (A) as a substitute therefor because it is easier for the honeybees to leave through the bright outlet 12.

Also, in case of removing the beehive it is convenient to assemble and disassemble, handle and transport the pollen gathering device of the present invention because of its simplicity of construction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pollen gathering device adapted to be connected with a beehive comprising, as three individual main components thereof which can be readily assembled together, a chamber containing a top aperture and a side aperture, said side aperture containing a pollen gathering panel, and defining an inlet means to the chamber, an outlet means comprising side wall portions and a top portion, said outlet means being operatively and removably associated with said top aperture, and a pollen collecting means operatively and removably associated with a lower portion of said chamber, whereby said pollen gathering device can be readily assembled and disassembled as desired.

2. A pollen gathering device adapted to be connected with a beehive with comprises, a chamber, inlet means for providing access to said chamber, and separate outlet means disposed at the top of the chamber for providing an exit from said chamber, said outlet means comprising sidewall portions and a top portion, said sidewall portions containing a grid-like configuration to permit the passage of light and attract the bees to the outlet means and said top portion containing a plurality of apertures to enable the bees to exit from the chamber, and said inlet means containing a pollen gathering panel comprising a plurality of projecting elements and having a grid-like configuration defining a plurality of apertures with the projecting elements extending into said apertures to facilitate the gathering of the pollen as the bees enter the device.

3. The pollen gathering device of claim 2 wherein the chamber is provided with a drawer-type structure operatively disposed below the inlet means for collecting and removing pollen from the device.

* * * * *